US010574468B2

(12) United States Patent
Kim et al.

(10) Patent No.: US 10,574,468 B2
(45) Date of Patent: Feb. 25, 2020

(54) CHAOS NANONET DEVICE, AND CHAOS NANONET-BASED PUF SECURITY APPARATUS

(71) Applicants: UNIVERSITY-INDUSTRY COOPERATION GROUP OF KYUNG HEE UNIVERSITY, Yongin-si, Gyeonggi-do (KR); RESEARCH & BUSINESS FOUNDATION SUNGKYUNKWAN UNIVERSITY, Suwon-si, Gyeonggi-do (KR)

(72) Inventors: Sun Kook Kim, Yongin-si (KR); Ik Joon Chang, Seoul (KR); Joon Sung Yang, Suwon-si (KR)

(73) Assignees: UNIVERSITY-INDUSTRY COOPERATION GROUP OF KYUNG HEE UNIVERSITY, Yongin-si (KR); RESEARCH BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 247 days.

(21) Appl. No.: 15/542,551

(22) PCT Filed: Jan. 6, 2016

(86) PCT No.: PCT/KR2016/000108
§ 371 (c)(1),
(2) Date: Nov. 20, 2017

(87) PCT Pub. No.: WO2016/111550
PCT Pub. Date: Jul. 14, 2016

(65) Prior Publication Data
US 2018/0062864 A1    Mar. 1, 2018

(30) Foreign Application Priority Data

Jan. 8, 2015  (KR) .................. 10-2015-0002799
Mar. 13, 2015 (KR) .................. 10-2015-0035205
Mar. 13, 2015 (KR) .................. 10-2015-0035206

(51) Int. Cl.
*G06F 21/00* (2013.01)
*H04L 9/32* (2006.01)
(Continued)

(52) U.S. Cl.
CPC .......... *H04L 9/3278* (2013.01); *H01L 23/528* (2013.01); *H01L 23/53276* (2013.01);
(Continued)

(58) Field of Classification Search
CPC ..... H04L 9/3278; H04L 9/001; H01L 23/528; H01L 23/53276; H01L 23/573;
(Continued)

(56) References Cited

U.S. PATENT DOCUMENTS

2004/0192072 A1* 9/2004 Snow .................. B82Y 10/00
                                                              438/800
2007/0114120 A1    5/2007 Konesky
(Continued)

FOREIGN PATENT DOCUMENTS

EP            2 053 495 A2   4/2009
KR    10-2007-0065356 A      6/2007
(Continued)

OTHER PUBLICATIONS

Ninad Pimparkar et al. "Theory and Practice of "Striping" for Improved ON/OFF Ratio in Carbon Nanonet Thin Film Transistors", Nano Research, 2009, pp. 167-175.
(Continued)

*Primary Examiner* — Jeffrey C Pwu
*Assistant Examiner* — Helai Salehi
(74) *Attorney, Agent, or Firm* — Sughrue Mion, PLLC

(57) ABSTRACT

The present invention discloses a chaos nanonet device including a nanonet material having metallic and semiconductive properties dispersed on a substrate and an electrode array composed of a plurality of electrodes that has a selected domain size on the nanonet material, and a PUF security apparatus based on the chaos nanonet device.

18 Claims, 23 Drawing Sheets

(51) Int. Cl.
| | | |
|---|---|---|
| *H01L 29/06* | (2006.01) | |
| *H01L 23/528* | (2006.01) | |
| *H01L 23/532* | (2006.01) | |
| *H01L 23/00* | (2006.01) | |
| *H04L 9/00* | (2006.01) | |

(52) U.S. Cl.
CPC ............ *H01L 23/573* (2013.01); *H01L 29/06* (2013.01); *H04L 9/001* (2013.01)

(58) Field of Classification Search
CPC ...... G06F 21/12; G06F 21/121; G06F 21/123; G06F 21/125; G06F 21/126; G06F 21/128; G06F 21/14
See application file for complete search history.

(56) References Cited

U.S. PATENT DOCUMENTS

| | | | |
|---|---|---|---|
| 2009/0254981 A1* | 10/2009 | Devadas | ................ G06F 21/31 726/5 |
| 2010/0044679 A1 | 2/2010 | Buh et al. | |
| 2010/0127242 A1 | 5/2010 | Zhou et al. | |
| 2011/0147715 A1* | 6/2011 | Rogers | ................... B82Y 10/00 257/24 |
| 2013/0119348 A1 | 5/2013 | Zhou et al. | |

FOREIGN PATENT DOCUMENTS

| | | |
|---|---|---|
| KR | 10-2009-0080653 A | 7/2009 |
| KR | 10-2013-0048717 A | 5/2013 |
| KR | 10-2014-0059485 A | 5/2014 |
| KR | 10-1393806 B1 | 5/2014 |

OTHER PUBLICATIONS

G. Edward Suh et al., "Physical Unclonable Functions for Device Authentication and Secret Key Generation", In ACM Design Automation Conference(DAC), 2007, pp. 9-14.

International Search Report for PCT/KR2016/000108, dated Apr. 22, 2016.

* cited by examiner

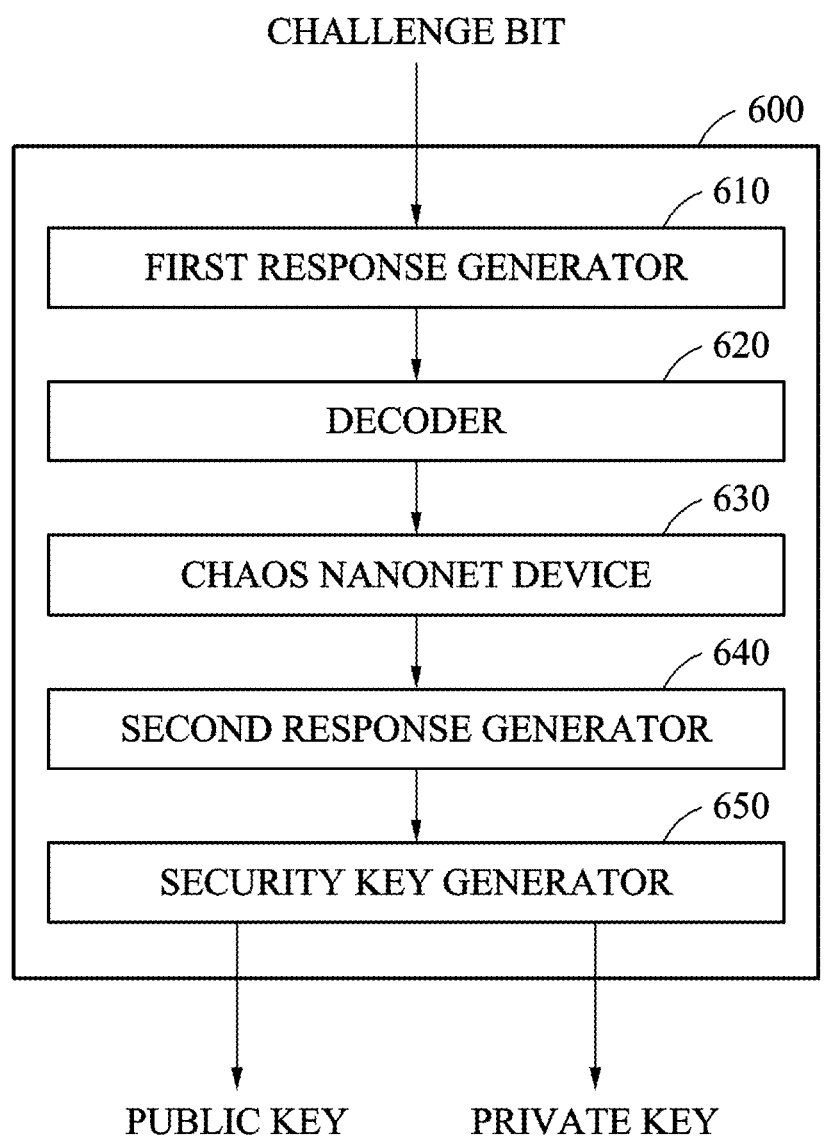

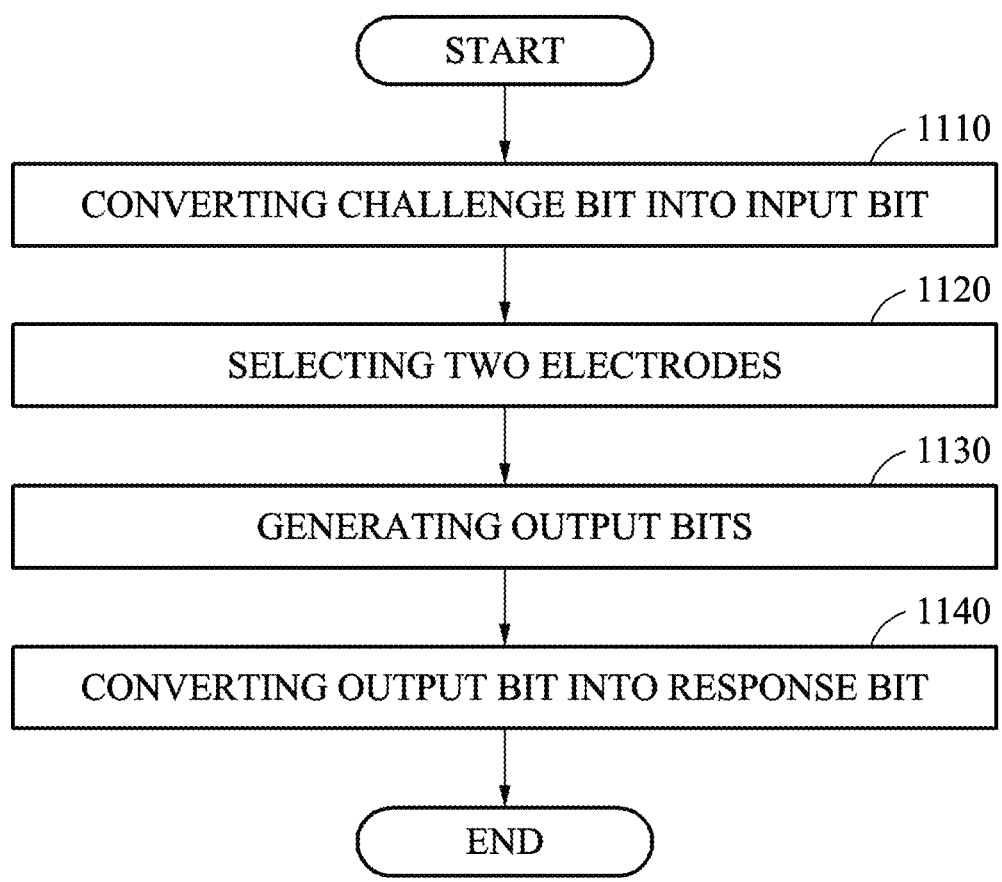

CHAOS NANONET DEVICE, AND CHAOS NANONET-BASED PUF SECURITY APPARATUS

CROSS-REFERENCE TO RELATED APPLICATIONS

This application claims the priority benefit of Korean Patent Application No. 10-2015-0002799, filed on Jan. 8, 2015, Korean Patent Application No. 10-2015-0035205, filed on Mar. 13, 2015, and Korean Patent Application No. 10-2015-0035206, filed on Mar. 13, 2015, in the Korean Intellectual Property Office, the disclosure of which is incorporated herein by reference.

TECHNICAL FIELD

The present invention relates to a chaos nanonet device and a chaos nanonet-based PUF security apparatus.

BACKGROUND ART

With the development of information and communication technology, there is a tendency to integrate information and communication technology into various fields such as the medical industry, healthcare, remote meter reading, smart home, and smart car. In particular, there is a tendency to use IoT (internet of things) technology to share information by connecting objects used in various fields through a network.

For example, in the medical industry, it is possible to share health information necessary for patient health maintenance with a principal physician in real-time by using IoT-based devices and to prescribe medicine and cope with the same in real time.

However, in recent years, security incidents where unauthorized users browse collected information frequently occur when information collected from each source object is transmitted to a destination object. Accordingly, there is a trend of applying security authentication to IoT so as to address security incidents.

For example, when a source object that collects data, such as a patient's bio-signal information and disease history information, transmits corresponding data to a destination object in the medical industry, an authorized user reads data from the destination object after security authentication.

As an example of a security authentication method, there is a method wherein hardware that stores key information (e.g., a private key, a public key, and the like) necessary for authentication based on a nonvolatile memory and performs security authentication using the stored key information.

However, a conventional authentication method of using hardware has a problem that hackers can leak key information, which is stored in a nonvolatile memory, through various memory reading methods.

In recent years, to address such problems of an authentication method using hardware, a technology of making copying physically impossible using a nanomaterial-based physical unclonable function (PUF) circuit is rapidly emerging.

A nanonet material may include at least one of a nanowire and a carbon nanotube (CNT).

A nanowire is a wire structure having a nanometer-scale size, and a carbon nanotube is a structure having a tubular shape wherein hexagons, each of which is composed of six carbon atoms, are connected to each other.

A nanonet material, such as a nanowire, a carbon nanotube, or the like, is a metallic or semiconductive material, and is used in various devices such as semiconductors, flat panel displays, batteries, ultra-high strength fibers, biosensors, and Braun tubes.

However, a nanonet material has a disadvantage in that it is difficult to control chirality thereof in a growth process and thus it is difficult to realize a large-area integrated circuit. To address such a disadvantage, research into eliminating or alleviating defects occurring during growth of a nanonet material is actively underway.

However, research into utilizing defects during growth of a nanonet material has not yet been performed.

A carbon nanotube (CNT), as a nanomaterial, is a new material having a tubular shape wherein hexagons, each of which is composed of six carbon atoms, are connected to each other, and is used in various devices such as semiconductors, flat panel displays, batteries, ultra-high strength fibers, biosensors, and Braun tubes.

However, since such a carbon nanotube has a growth temperature of 900° C. or more, there are difficulties in growing the same on a plastic substrate.

DISCLOSURE

Technical Problem

Therefore, the present invention has been made in view of the above problems, and it is one object of the present invention to provide a chaos nanonet device for forming a carbon nanotube grown on a flexible substrate and a PUF security apparatus based on the chaos nanonet.

It is another object of the present invention to provide a chaos nanonet device and PUF security apparatus for increasing an inherent characteristic of physically unclonable function using chirality occurring during growth of a nanonet material.

It is another object of the present invention to provide a chaos nanonet device and PUF security apparatus including a nanonet material, the ambiguity of a signal for which is eliminated by selected electrodes to which a bias is applied in an off current range.

It is another object of the present invention to provide a chaos nanonet device and PUF security apparatus for increasing the stability of security authentication by providing randomness of a signal path.

It is another object of the present invention to provide a chaos nanonet device and PUF security apparatus for increasing the stability of security authentication by using a response generator at an input/output end of a chaos nanonet device to increase the number of correspondence cases between a challenge bit and a response bit.

It is yet another object of the present invention to provide a chaos nanonet device and PUF security apparatus for maximizing randomness of a signal path of a nanonet material using an electric burning method.

Technical Solution

In accordance with an aspect of the present invention, the above and other objects can be accomplished by the provision of a chaos nanonet device including a nanonet material having metallic and semiconductive properties dispersed a substrate; and an electrode array composed of a plurality of electrodes that has a selected domain size on the nanonet material and includes selected electrodes to which a bias is applied in an off current range, wherein the nanonet material provides a signal path betweento any electrodes selected from the electrode array.

The selected electrodes may be biased in a metallic/semiconductive current ratio selected in the off current range.

A signal of the nanonet material may be classified into signals corresponding to a metallic property and a semiconductive property by the selected electrodes.

In addition, the nanonet material may be dispersed on the substrate in at least one shape of a random network, a directional network, a crossbar network, and a combination of the random network, the directional network, and the crossbar network.

In addition, the nanonet material may include randomness of a signal path generated by an etching process of providing a selected pattern.

The chaos nanonet device may generate output bits corresponding to signal path formation between two electrodes selected in association with input bits.

In accordance with another aspect of the present invention, there is provided a chaos nanonet device including a plurality of carbon nanotubes formed on a flexible substrate; and an electrode array including a plurality of electrodes that is formed on the carbon nanotubes and has a selected domain size, wherein the carbon nanotubes provide a signal path to corresponding chirality betweento any electrodes selected from the electrode array.

The carbon nanotubes may be formed on the flexible substrate by at least one spray coating method of a slot die coating method and a mayer bar coating method.

In addition, a sacrificial layer is formed on a hard substrate, the flexible substrate may be formed on the formed sacrificial layer, and the flexible substrate and the hard substrate may be separated from each other by contacting water.

In addition, the carbon nanotubes may be formed on the substrate in at least one shape of a random network, a directional network, a crossbar network, and a combination of the random network, the directional network, and the crossbar network.

In addition, the carbon nanotubes may include randomness of a signal path generated by an etching process of providing a selected pattern.

The metallic property of the carbon nanotubes around the selected electrodes by applying voltage to the selected electrodes may be eliminated.

In accordance with another aspect of the present invention, there is provided a chaos nanonet device including a nanonet material dispersed on a substrate using chirality; and an electrode array composed of a plurality of electrode that has a selected domain size on the nanonet material and includes selected electrodes to which voltage is applied based on an electrical burning manner, wherein the nanonet material provides a signal path betweento any electrodes selected from the electrode array.

The metallic property of the nanonet material around the selected electrodes may be eliminated by the electric burning method.

By the electric burning method, voltage may be applied to the selected electrode by sweeping the voltage considering at least one of a growth density function parameter, the metallic parameter, and a semiconductive parameter of the nanonet material.

In addition, by the electric burning method, voltage may be applied to the selected electrodes corresponding to a map rule considering at least one of the selected domain size and the number of a plurality of electrodes.

In accordance with another aspect of the present invention, there is provided a chaos nanonet-based physical unclonable function (PUF) security apparatus including a first response generator generating a challenge bit into an input bit; a decoder selecting two electrodes that correspond to an address related to the generated input bit; a chaos nanonet device generating an output bit for signal path formation between the selected electrodes; a second response generator generating the output bit into a response bit; and a security key generator generating the response bit into a public key and a private key using an application specific integrated circuit (ASIC), wherein the chaos nanonet device includes a nanonet material having metallic and semiconductive properties dispersed on the substrate; and an electrode array composed of a plurality of electrodes that has a selected domain size on the nanonet material and include selected electrodes to which a bias is applied in an off current range.

The nanonet material may be composed of carbon nanotubes formed on a flexible substrate, and the carbon nanotubes may be formed on the flexible substrate by at least one spray coating method of a slot die coating method and a mayer bar coating method.

In accordance with yet another aspect of the present invention, there is provided a chaos nanonet-based physical unclonable function (PUF) security apparatus comprising a first response generator generating a challenge bit into an input bit; a decoder selecting two electrodes that correspond to an address related to the generated input bit; chaos nanonet device generating an output bit for signal path formation between the selected electrodes; a second response generator generating the output bit into a response bit; and a security key generator generating the response bit into a public key and a private key using an application specific integrated circuit (ASIC), wherein the chaos nanonet device includes a nanonet material dispersed on the substrate using chirality; and an electrode array composed of a plurality of electrodes that has a selected domain size on the nanonet material and includes selected electrode to which voltage is applied based on an electric burning method.

Advantageous Effects

The present invention may form a carbon nanotube grown on a flexible substrate.

The present invention may increase an inherent characteristic of physically unclonable function using chirality occurring during growth of a carbon nanotube.

The present invention may increase the stability of security authentication by providing randomness of a signal path.

The present invention may increase the stability of security authentication by applying a multiple input shift register to an input/output end of a chaos nanonet device to increase the number of correspondence cases between a challenge bit and a response bit.

The present invention may provide a chaos nanonet device for forming a carbon nanotube grown on a flexible substrate and a PUF security apparatus based on the chaos nanonet.

The present invention may increase an inherent characteristic of physically unclonable function using chirality occurring during growth of a nanonet material.

The present invention may provide a chaos nanonet device and PUF security apparatus including a nanonet material, the ambiguity of a signal for which is eliminated by selected electrodes to which a bias is applied in an off current range.

The present invention may increase the stability of security authentication by providing randomness of a signal path.

The present invention may increase the stability of security authentication by using a response generator at an input/output end of a chaos nanonet device to increase the number of correspondence cases between a challenge bit and a response bit.

The present invention may maximize randomness of a signal path of a nanonet material using an electric burning method.

DESCRIPTION OF DRAWINGS

FIG. 10 is a block diagram illustrating a physical unclonable function (PUF) security apparatus based on a chaos nanonet according to an embodiment of the present invention.

FIG. 13 is a flowchart illustrating an operation method of a chaos nanonet-based physical unclonable function security apparatus according to an embodiment of the present invention.

BEST MODE

When an element or a layer is referred to as being "on" another element or layer, the element or the layer can be directly on another element or layer or an intervening element or layer can be present. On the other hand, when an element or a layer is referred to as being "directly on" another element or layer, an intervening element or layer cannot be present.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
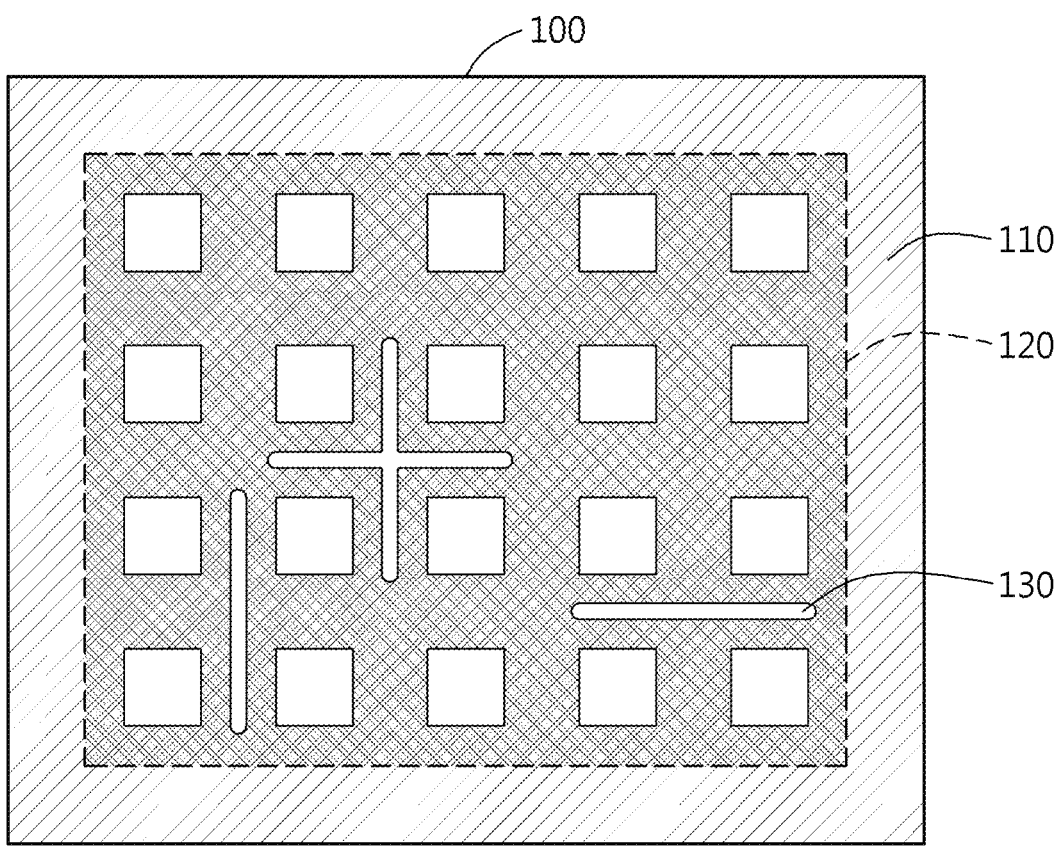
FIG. 1 illustrates a chaos nanonet device according to an embodiment of the present invention.

FIG. 1 illustrates a chaos nanonet device according to an embodiment of the present invention.

Referring to FIG. 1, a chaos nanonet device 100 includes a substrate (not shown), a nanonet material 110, and an electrode array 120.

The nanonet material 110 having metallic and semiconductive properties is dispersed on the substrate. Here, the nanonet material 110 may include at least one of a nanowire and a carbon nanotube (CNT). In addition, the nanonet material 110 may include at least one of a plurality of a nanowires and a plurality of carbon nanotubes.

In addition, the nanonet material 110 may be dispersed on the substrate using chirality.

A nanowire refers to a wire structure having a nanometer-scale size, and a carbon nanotube refers to a structure having a tubular shape wherein hexagons, each of which is composed of six carbon atoms, are connected to each other.

A nanonet material, such as a nanowire or a carbon nanotube, is a material having metallic or semiconductive properties and is used in various devices such as semiconductors, flat panel displays, batteries, ultra-high strength fibers, biosensors, and Braun tubes.

The nanonet material 110 may be dispersed on the substrate considering a selected density and thickness. The density and thickness selection may be dependent upon the diameter of the nanonet material and chirality, and may be varied depending upon an environmental condition of a hardware in which the nanonet material is used, e.g., conditions such as temperature variation and deterioration.

In addition, the nanonet material 110 has an advantage such as ultra-high mobility, without scattering, due to nano-scale quantum effect, but has chirality wherein large-area growing materials do not provide uniform electrical properties. That is, the nanonet material 110 has a defect in that a growth density function and metallic or semiconductive properties are randomly exhibited during growth.

In accordance with an embodiment, the chaos nanonet device 100 may be applied to a security apparatus having physical unclonable function (PUF) which increases the stability of security authentication using the chirality of the nanonet material 110.

More particularly, the chaos nanonet device 100 may be applied to a PUF security apparatus that increases the stability of security authentication using randomness of a signal path of the nanonet material 110.

The electrode array 120 is composed of a plurality of electrodes with a selected domain size that is provided on the nanonet material 110 and includes a selected electrode biased in an off current range.

The domain size selection may be determined considering an input area for input bits of the PUF security apparatus (or security chip) and an output area for output bits of the PUF security apparatus corresponding to the input bits.

In addition, the nanonet material 110 may be composed of a plurality of carbon nanotubes as described above. Here, the carbon nanotubes may be formed on a flexible substrate.

The flexible substrate may include at least one material of polyimide (PI), polyester, polyethylene napthalate (PEN), Teflon, polyethylene terephthalate (PET), polydimethyl siloxane (PDMS), and other polymers.

In addition, the carbon nanotubes may be formed on a flexible substrate in at least one spray coating method of a slot die coating method and a mayer bar coating method.

The carbon nanotubes are dispersed on a flexible substrate using chirality.

In addition, the carbon nanotubes may be dispersed on the substrate considering a selected density and thickness. The density and thickness selection may be dependent upon the diameter of the carbon nanotubes and chirality, and may be varied depending upon an environmental condition of a hardware in which the carbon nanotubes are used, e.g., conditions such as temperature variation and deterioration.

The carbon nanotubes have an advantage such as ultra-high mobility, without scattering, due to nano-scale quantum effect, but have chirality wherein large-area growing materials do not provide uniform electrical properties. That is, the carbon nanotubes have a defect in that a growth density function and metallic or semiconductive properties are randomly exhibited during growth.

The chaos nanonet device 100 according to an embodiment of the present invention may increase the stability of security authentication using the chirality of the carbon nanotubes 의 을. More particularly, the chaos nanonet device 100 may increase the stability of security authentication using a random path of the carbon nanotubes.

The carbon nanotubes may be dispersed on the substrate in at least one shape of a random network, a directional network, a crossbar network, and a combination of the random network, the directional network, and the crossbar network.

Hereinafter, an embodiment of a method of forming the carbon nanotubes on a flexible substrate using a spray coating method is described with reference to FIGS. 2 and 3.

Figure 2:
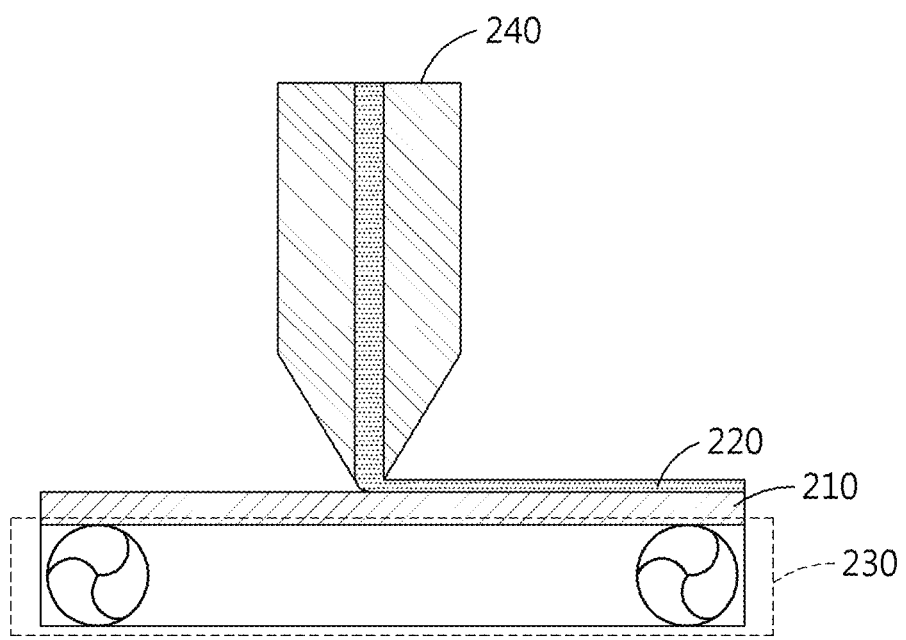
FIG. 2 illustrates a slot die coating device for forming a plurality of carbon nanotubes, as a nanonet material, on a flexible substrate according to an embodiment of the present invention.

FIG. 2 illustrates a slot die coating device for forming the carbon nanotubes, as a nanonet material, on a flexible substrate according to an embodiment of the present invention.

The carbon nanotubes according to an embodiment of the present invention may be formed to a determined thickness on a flexible substrate 210 using a slot die coater 230 and a slot die 240 of a slot die coating device.

Referring to FIG. 2, a slot die coating device for forming the carbon nanotubes on the flexible substrate 210 of the present invention may form the carbon nanotubes 220 to a determined thickness on the flexible substrate 210 by controlling a moving speed of the flexible substrate 210 and the amount of the carbon nanotubes 220, and may perform a continuous process using a roll to roll process. Here, the carbon nanotubes 200 may be in a solution state.

A slot die coating device for forming the carbon nanotubes 200 on the flexible substrate 210 of the present invention may include a slot die coater 230 and a slot die 240.

The slot die coater 230 may include one or more rollers to move the flexible substrate 210 in a traveling direction.

The slot die 240 may be disposed in a direction orthogonal to a traveling direction of the flexible substrate 210 or in a predetermined angle direction, and may include a hole for discharging the carbon nanotubes. For example, the slot die 240 may discharge the carbon nanotubes through the hole as ink flows from an end of a tip of a fountain pen.

In accordance with an embodiment, the slot die 240 is fixed at a predetermined location, and the flexible substrate 210 may be moved by the slot die coater 230.

Figure 3:
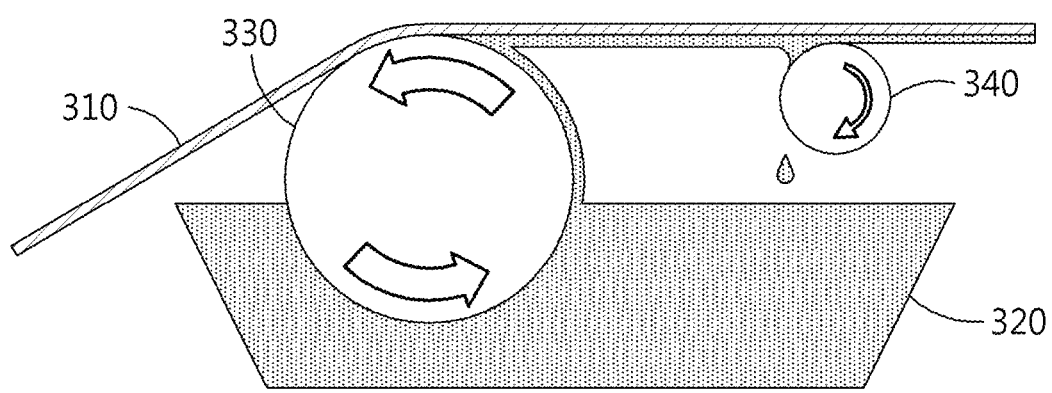
FIG. 3 illustrates a mayer bar device for forming a plurality of carbon nanotubes, as a nanonet material, on a flexible substrate of the present invention.

FIG. 3 illustrates a mayer bar device for forming the carbon nanotubes, as a nanonet material, on a flexible substrate of the present invention.

Referring to FIG. 3, the mayer bar device may be constituted of a guide roll 330, a mayer bar roll 340, and a solution tank including carbon nanotubes 320 stored therein. Here, the carbon nanotubes 320 may be in a solution state.

The mayer bar device may move the flexible substrate 310 by the guide roll 330 in a traveling direction, and make the carbon nanotubes 320 contained in the solution tank to contact the guide roll 330.

The guide roll 330 may rotate the flexible substrate 310 in a traveling direction. By this rotation, the carbon nanotubes 320 may be spread on a contact surface of the guide roll 330.

In addition, the guide roll 330 may spread the carbon nanotubes 320, which have been spread on a contact surface of the guide roll 330, on the flexible substrate 310 while rotating and contacting the flexible substrate 310.

The mayer bar roll 340 may make the carbon nanotubes 320 having a determined thickness to be formed the flexible substrate 310 while rotating and controlling the amount of the carbon nanotubes 320 spread on the flexible substrate 310.

The aforementioned flexible substrate 310 has a property of being bent or stretched by heat, and thus, there may be a disadvantage in that the carbon nanotubes 320 are formed on the flexible substrate 310.

Accordingly, the chaos nanonet device of the present invention may require a process of fabricating a flexible substrate so as to address the drawback.

Figure 4:
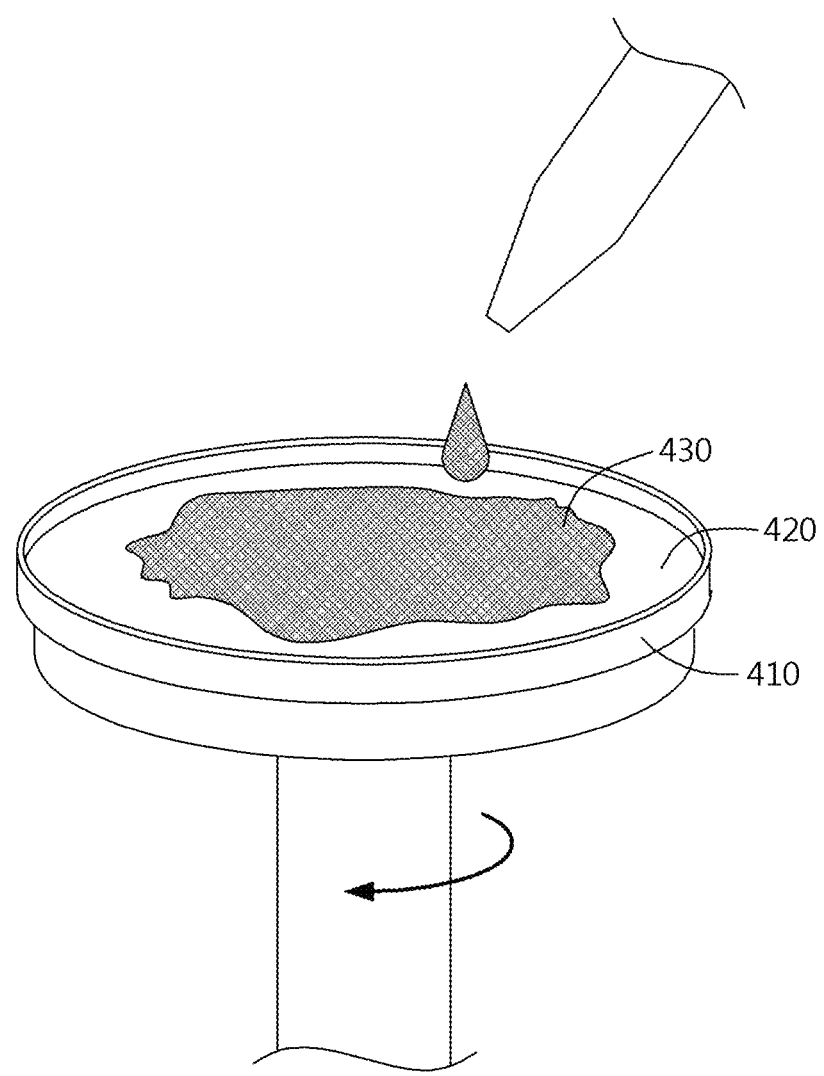
FIG. 4 illustrates a process of fabricating a flexible substrate on a hard substrate and sacrificial layer.

FIG. 4 illustrates a process of fabricating a flexible substrate on a hard substrate and sacrificial layer. Referring to FIG. 4, the process of fabricating flexible substrate may include a process of forming a sacrificial layer 420 on a hard substrate 410, a process of forming a flexible substrate 430 on the formed sacrificial layer 420, and a process of separating the flexible substrate 430 and the hard substrate 410 from each other by contacting water.

The hard substrate 410 may include a silicon (Si) wafer material, which maintains an operation layer or the shape of a semiconductor device, is free from defects at high purity, and has superior electrical properties, and a hard insulating glass.

The sacrificial layer 420 is used as an element for separating the hard substrate 410 and the flexible substrate 430 from each other. In addition, the sacrificial layer 420 includes at least one of water-soluble polyvinyl alcohol and germanium oxide ($Ge_2O_3$), and may be formed on the hard substrate 410 by spin coating.

The flexible substrate 430 is formed of a single layer. In addition, the flexible substrate 430 is formed directly on the sacrificial layer 420, thereby contacting the sacrificial layer 420.

More particularly, the flexible substrate 430 may be formed by spreading a liquid polymeric material on the sacrificial layer 420 and then performing spin coating.

Here, the carbon nanotubes may be formed on the flexible substrate 430. In addition, when the carbon nanotubes are stably formed on the flexible substrate 430, the flexible substrate 430 may be separated from the hard substrate 410 by contacting the sacrificial layer 420 and water.

Hereinafter, the chaos nanonet device 100 wherein the ambiguity of a signal for the nanonet material 110 is eliminated by a selected electrode biased in an off current range is described in detail with reference to FIGS. 2a and 2b.

Figure 5A:
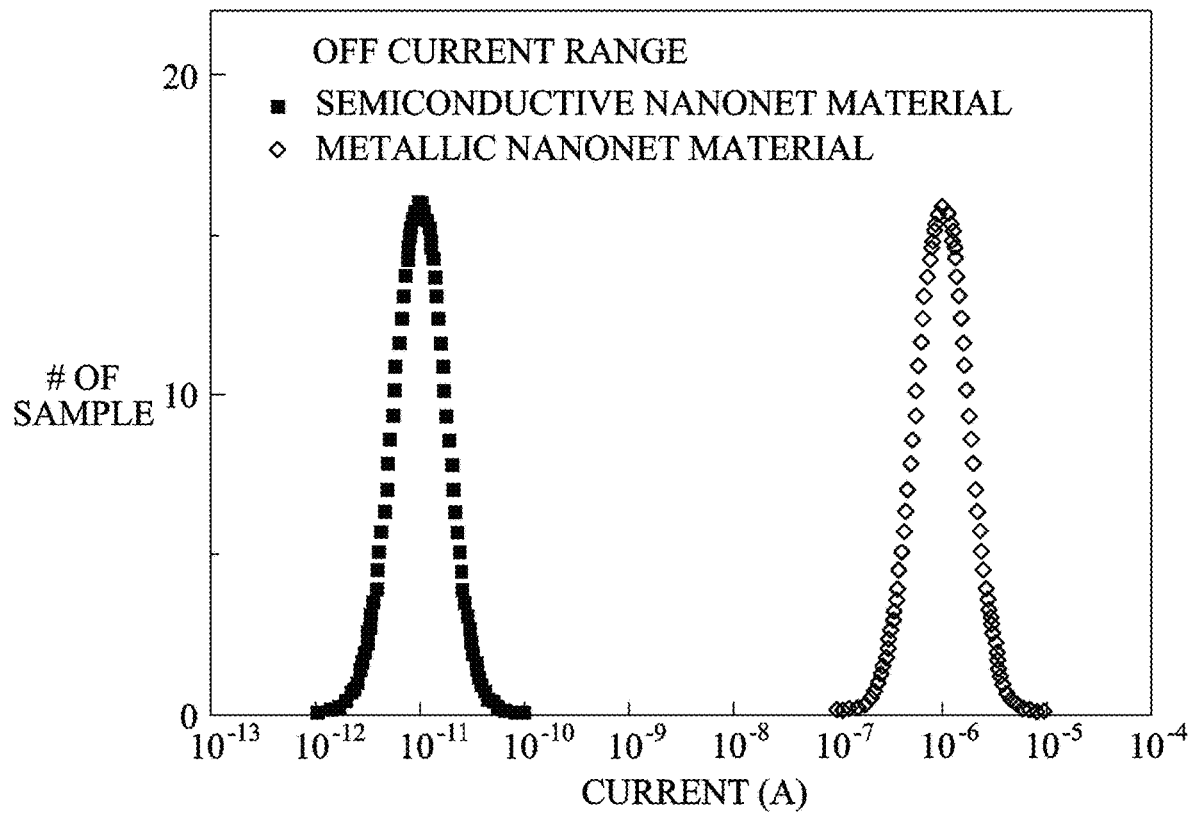
FIG. 5A illustrates the electrical property of a nanonet material having metallic and semiconductive properties.
Figure 5B:
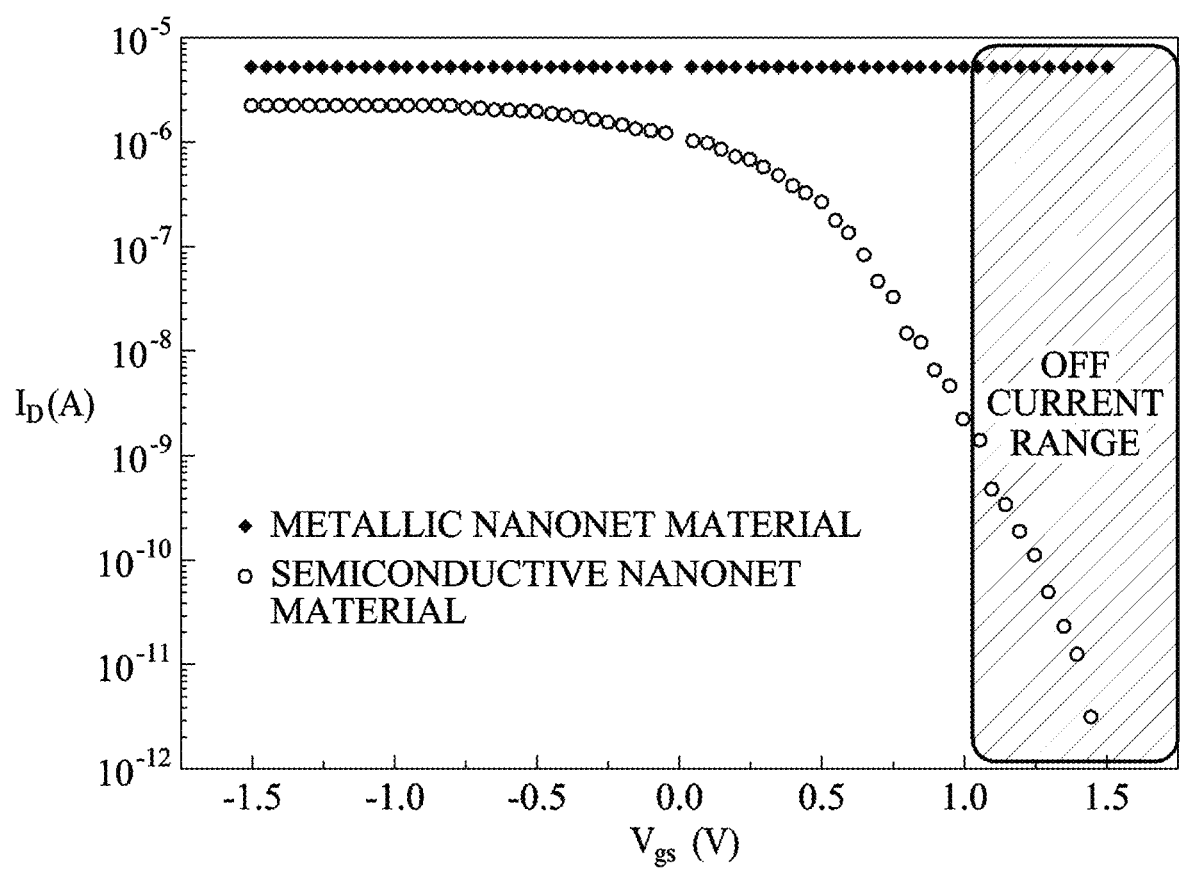
FIG. 5B illustrates a relationship between current and voltage of a nanonet material having metallic and semiconductive properties.

FIG. 5A illustrates the electrical property of a nanonet material having metallic and semiconductive properties, and FIG. 5B illustrates a relationship between current and voltage of a nanonet material having metallic and semiconductive properties.

Referring to FIG. 5A, the conductivity of a metallic nanonet material is about five times lower than that of a semiconductive nanonet material, and thus, may be difficult to electrically provide signals of "0" and "1".

Meanwhile, referring to FIG. 5B, when a bias is applied to a selected electrode (e.g., gate electrode) in a metallic to semiconductive current ratio (e.g., a current difference between a metallic property and a semiconductive property is 1000 times) selected in an off current range, a signal of a nanonet material may be divided into "0" and "1", which respectively correspond to metallic and semiconductive properties, by the selected electrode.

Here, each of the electrodes may include a source electrode, a drain electrode, and a gate electrode.

In addition, in an off current range, a bias may be applied to a selected electrode corresponding to a map rule considering at least one of a selected domain size and the number of a plurality of electrodes.

The map rule may include information on the number and location of selected electrodes that correspond to at least one of each of selected domain sizes and each of electrode numbers.

In accordance with an embodiment, a signal of a nanonet material may be divided into "0" and "1" which correspond to metallic and semiconductive properties by applying a bias to a selected electrode in a selected metallic/semiconductive current ratio in an off current range.

More particularly, as illustrated in FIG. 2b, the conductivity of a metallic nanonet material is hardly changed when a bias is applied to a gate electrode in a selected metallic/semiconductive current ratio. However, in this case, the conductivity of a semiconductive nanonet material may be changed.

Accordingly, a signal of the nanonet material is divided into signals corresponding to metallic and semiconductive properties by a selected electrode, whereby the ambiguity of a signal may be eliminated.

In accordance with an embodiment, the nanonet material may be dispersed on the substrate in at least one shape of a random network, a directional network, a crossbar network, and a combination of the random network, the directional network, and the crossbar network.

Figure 6:
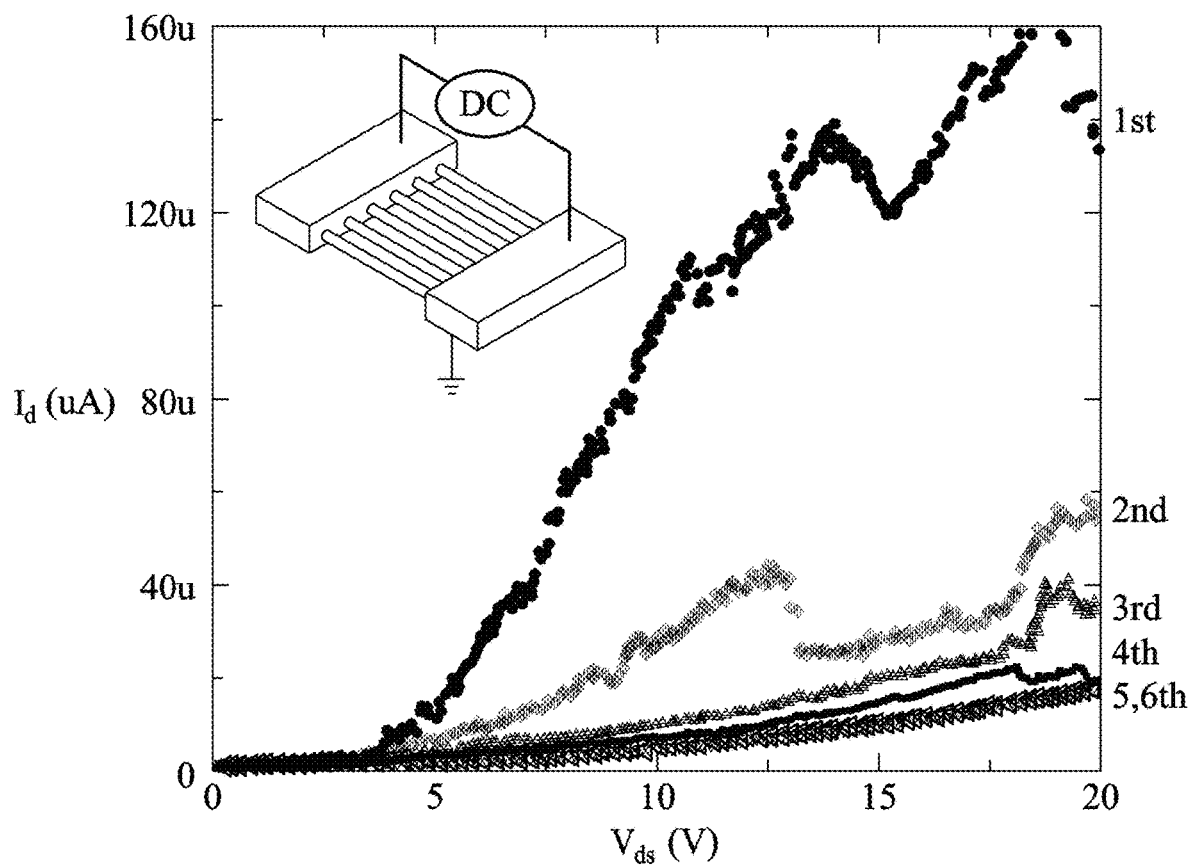
FIG. 6 illustrates a relationship between current and voltage according to an electric burning method.

FIG. 6 illustrates a relationship between current and voltage according to an electric burning method.

Referring to FIG. 6, the metallic property of a nanonet material around electrodes selected by an electric burning method may be eliminated. Here, each of the electrodes may include a source electrode, a drain electrode, and a gate electrode.

For example, the metallic property of a nanonet material around a drain electrode to which voltage is applied may be eliminated. Here, the gate electrode may be in a floating state.

In accordance with an aspect of the present invention, by the electric burning method, voltage may be applied to the selected electrode by sweeping voltage considering at least one of a growth density function parameter, a metallic parameter, and a semiconductive parameter of the nanonet material.

For example, each of the parameters may be measured by means of a parameter meter (HP 4156A).

In addition, in the case of an electric burning method, four-step voltages (5 V, 10 V, 15 V, 20 V, etc.) may be applied to the selected electrode by sweeping the voltages, as illustrated in FIG. 6.

In accordance with another aspect of the present invention, in the case of electric burning method, voltage may be applied to a selected electrode corresponding to a map rule considering at least one of a selected domain size and the number of a plurality of electrodes.

The map rule may include information on the number and locations of selected electrodes corresponding to at least one of selected domain sizes and electrode numbers.

In accordance with an embodiment, the metallic property around a selected electrode is eliminated by applying voltage to the selected electrode, and the nanonet material may generate an artificial signal "0".

Accordingly, the chaos nanonet device may provide randomness of a signal path for the nanonet material by the electric burning method.

In accordance with an embodiment, the nanonet material may be dispersed on a substrate in at least one shape of a random network, a directional network, a crossbar network, and a combination of the random network, the directional network, and the crossbar network.

Hereinafter, a network shape of the nanonet material 110 is described in detail with reference to FIGS. 7A to 7C and FIG. 8A to 8F.

Figure 7A:
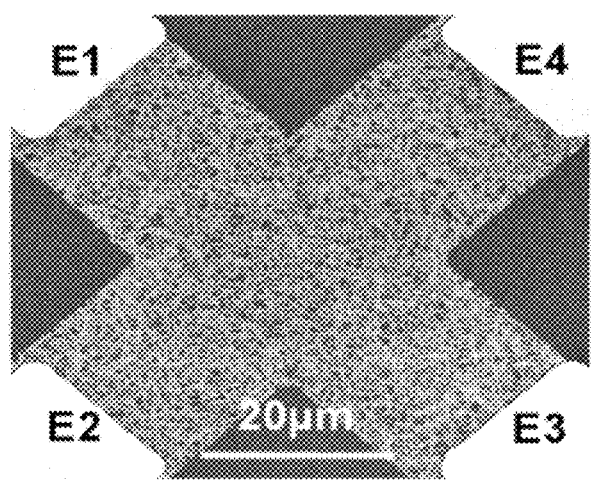
FIGS. 7A to 7C illustrate embodiments of a network shape of a nanonet material.
Figure 7B:
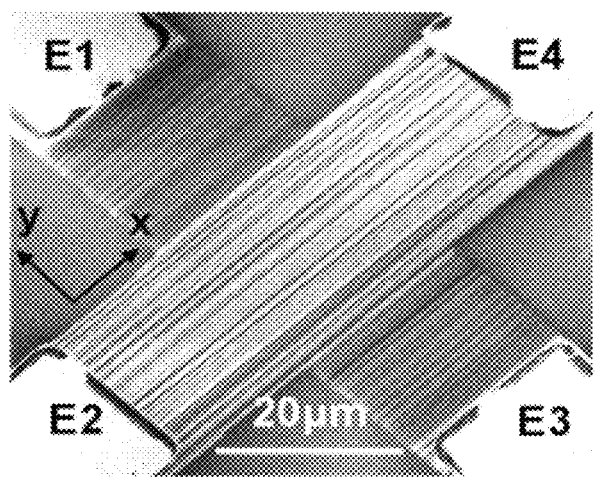
Figure 7C:
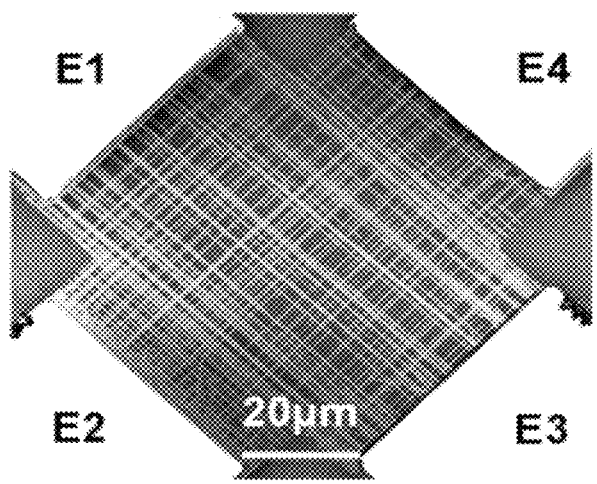

FIGS. 7A to 7C illustrate embodiments of a network shape of a nanonet material.

FIG. 7A illustrates a random network shape of a nanonet material. Referring to FIG. 7A, the nanonet material 110 may be dispersed in a random network shape without specific patterns and rules on the substrate.

In accordance with an aspect of the present invention, the nanonet material 110 may be dispersed in a random network shape on the substrate considering a selected density and thickness. The density and thickness selection may be determined by the diameters of the carbon nanotubes and chirality, and may be varied depending upon depending upon an environmental condition of a hardware in which the carbon nanotubes are used, e.g., conditions such as temperature variation and deterioration.

FIG. 7B illustrates a directional network shape of the nanonet material. Referring to FIG. 7B, the nanonet material 110 may be dispersed, in a directional network shape based on a vertical junction, on the substrate.

In accordance with an aspect of the present invention, since the nanonet material 110 is dispersed, in a directional network shape based on a vertical junction, on the substrate, the nanonet material 110 may be applied to security devices for ultra-small IoT apparatuses and may exhibit excellent field effect.

FIG. 7C illustrates a crossbar network shape of the nanonet material. Referring to FIG. 7C, the nanonet material 110 may be dispersed, in a crossbar network shape having a horizontal cross pattern, on the substrate.

FIGS. 8A to 8F illustrate a modified embodiment of a network shape of a nanonet material.

Figure 8A:
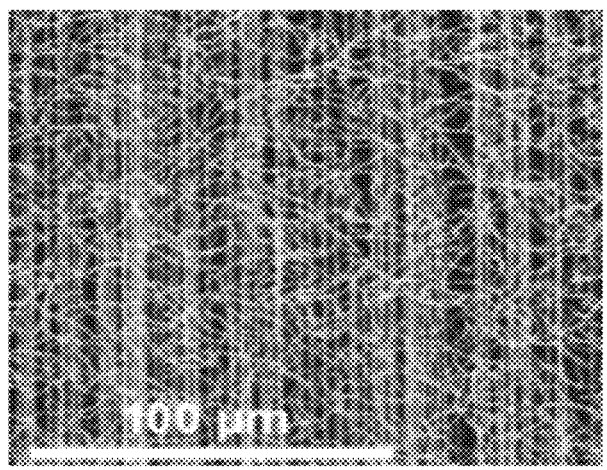
FIGS. 8A to 8F illustrate a modified embodiment of a network shape of a nanonet material.
Figure 8B:
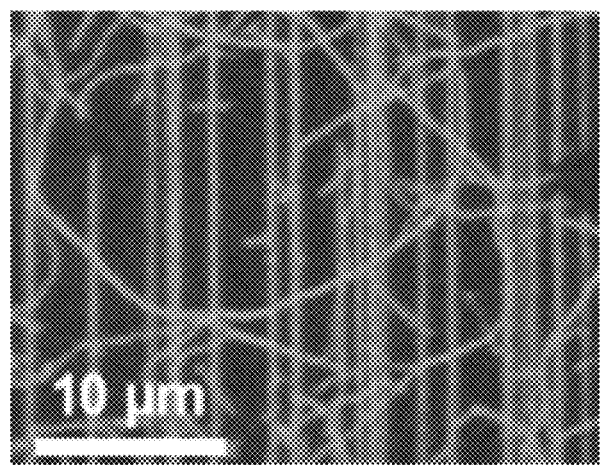

FIGS. 8A and 8B illustrate nanonet materials having a combined shape including the random network shape and the directional network shape. Referring to FIGS. 8A and 8B, the nanonet material 110 may be dispersed, in a combined shape including the random network shape and the directional network shape, on the substrate.

In accordance with an aspect of the present invention, the nanonet material 110 may be dispersed, in an anisotropic planar bilayer shape including the random network shape and the directional network shape, on the substrate.

Figure 8C:
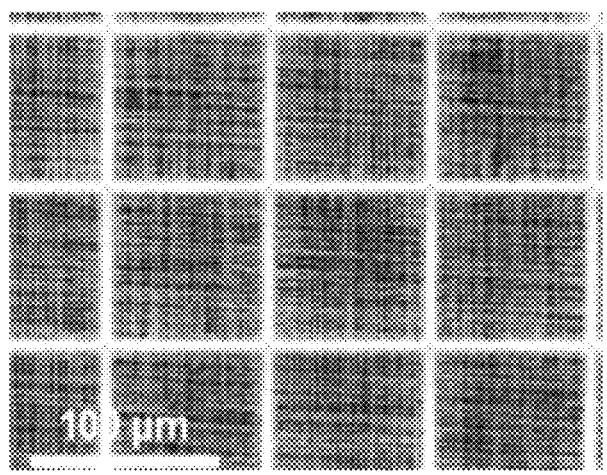
Figure 8D:
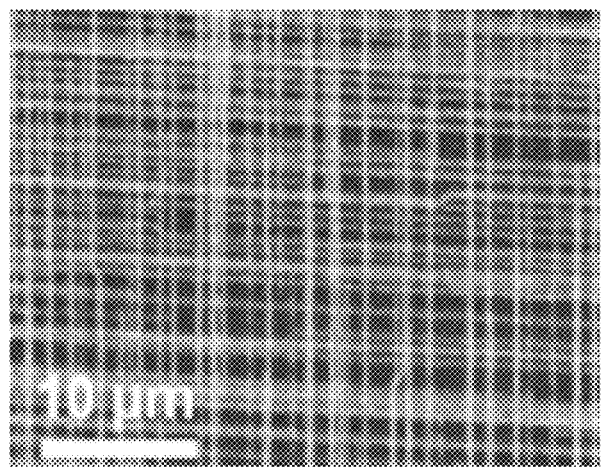

FIGS. 8C and 8D illustrate nanonet materials having a combined shape including the directional network and the crossbar network. Referring to FIGS. 8C and 8D, the nanonet material 110 may be dispersed, in a combined shape including the directional network and the crossbar network, on the substrate.

In accordance with an aspect of the present invention, the nanonet material 110 may be dispersed, in a multi-layered shape based on a superstructure wherein the directional network and the crossbar network are combined, on the substrate.

Figure 8E:
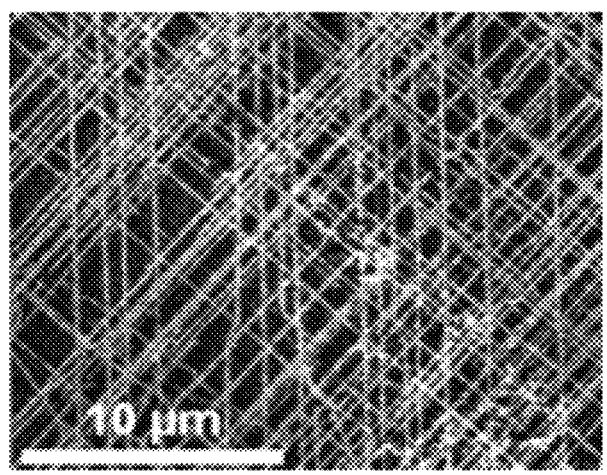
Figure 8F:
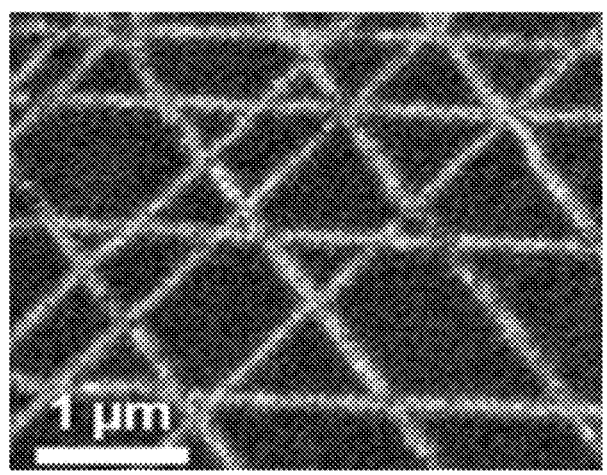

FIG. 8E and FIG. 8F illustrate directional network shapes of the nanonet material using a geometric structure. Referring to FIGS. 8C and 8D, the nanonet material 110 may be dispersed, in a directional network shape having a geometric structure, on the substrate.

In accordance with an aspect of the present invention, the nanonet material 110 may be dispersed, in a directional network shape with a geometric structure including a triple layer or a triangular network structure, on the substrate.

Referring to FIG. 1 again, the electrode array 120 is formed on the nanonet material 110 and includes a plurality of electrodes having a selected domain size. The domain size selection may be determined considering an input area for input bits of a security chip and an output area for output bits of the security chip corresponding to the input bits.

In addition, the nanonet material 110 provides a signal path betweento any electrodes selected from the electrode array 120.

In accordance with an embodiment, the nanonet material 110 provides a signal path, which corresponds to chirality, betweento any electrodes selected from the electrode array 120.

Here, a decoder may select any electrodes from the electrode array 120. Hereinafter, the decoder is described in detail with reference to the accompanying FIG. 10.

In addition, a signal path may be generated by chirality of the nanonet material 110. Hereinafter, a generation process of a signal path is described in detail with reference to FIGS. 9A to 9C.

Figure 9A:
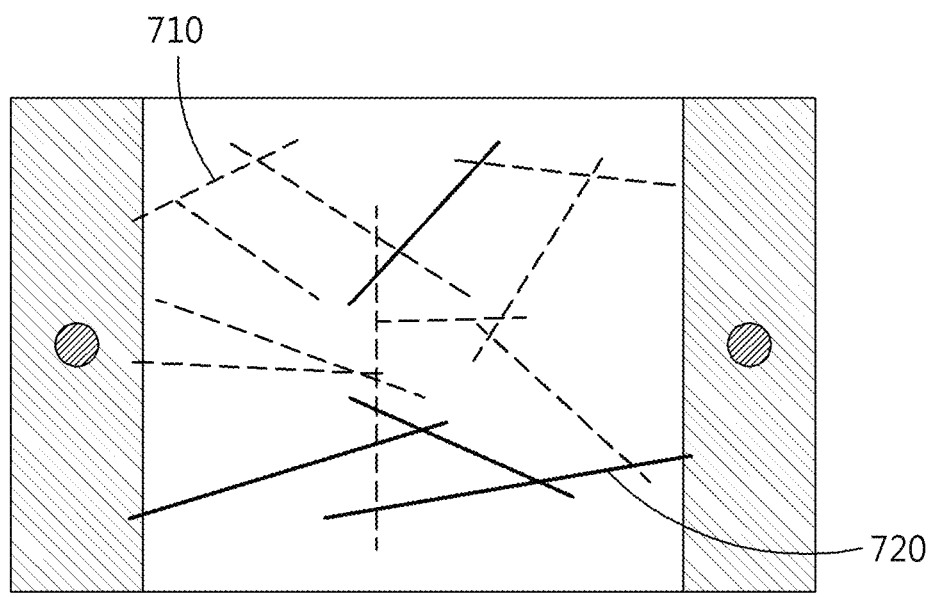
FIG. 9A illustrates an embodiment of a signal path generated by the metallic and semiconductive properties of a dispersed nanonet material according to an embodiment of the present invention.

FIG. 9A illustrates an embodiment of a signal path generated by the metallic and semiconductive properties of a dispersed nanonet material according to an embodiment of the present invention.

Referring to FIG. 9A, a signal path may be generated by chirality of a nanonet material. In particular, a signal path may be generated based on a metallic property 710 and semiconductive property 720 of the nanonet material.

As illustrated in FIG. 9A, a signal path may be formed to correspond to the nanonet material having the metallic property 710 and semiconductive property 720, based on two randomly selected electrodes.

That is, a signal path may be formed between two randomly selected electrodes based on the randomness of the dispersed carbon nanotubes having the metallic property 710 and the semiconductive property 720.

Figure 9B:
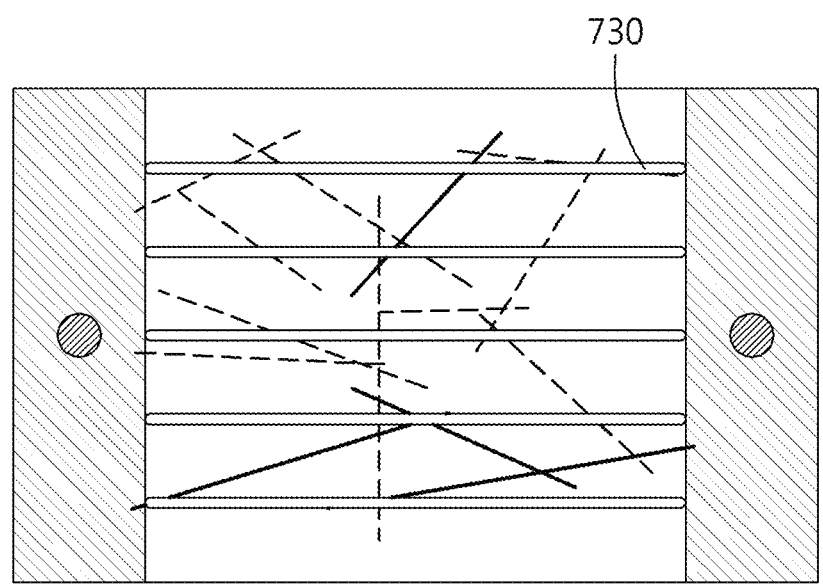
FIG. 9B illustrates an embodiment of a signal path generated by an etching pattern of a dispersed nanonet material according to an embodiment of the present invention.

FIG. 9B illustrates an embodiment of a signal path generated by an etching pattern of a dispersed nanonet material according to an embodiment of the present invention.

Referring to FIG. 9B, a signal path of the present invention may be generated by a selected etching pattern. For example, a dispersed nanonet material may include the randomness of a signal path that is generated by an etching process of a selected etching pattern.

A selected etching pattern 730 may be determined considering the positions of a plurality of electrodes in a chaos nanonet device. The selected etching pattern may include various patterns such as a "—"-shape pattern, a cross pattern, a zigzag pattern, and a combination thereof.

The chaos nanonet device of the present invention may increase the chirality of a dispersed nanonet material having metallic and semiconductive properties by the etching pattern 730. Due to the increased chirality, the randomness of a signal path may be provided.

Figure 9C:
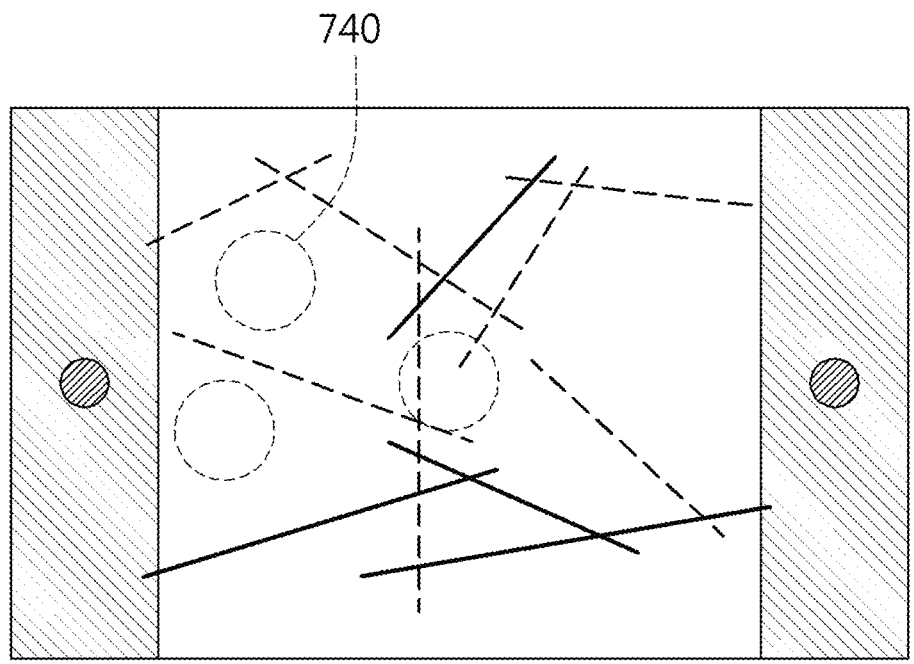
FIG. 9C illustrates an embodiment of a signal path generated by applying the voltage of a selected electrode to a dispersed carbon nanotube according to an embodiment of the present invention.

FIG. 9C illustrates an embodiment of a signal path generated by applying the voltage of a selected electrode to a dispersed carbon nanotube according to an embodiment of the present invention.

Referring to FIG. 9C, the signal path of the present invention may be generated by applying voltage to a selected electrode. For example, a dispersed nanonet material may include a region 740, a metallic property of which is eliminated by applying voltage to a selected electrode, around the selected electrode.

The chaos nanonet device of the present invention may provide the randomness of a signal path, by applying voltage to an electrode selected from among a plurality of electrodes included in the electrode array, to include the region 740, in which the metallic property of carbon nanotubes is eliminated, located around the selected electrode.

Referring to FIG. 1 again, the chaos nanonet device 100 may generate output bits of a PUF security apparatus corresponding to formation of a signal path between two electrodes selected in association with input bits of the PUF security apparatus. The two electrodes in association with the input bits may be selected by a decoder.

More particularly, the chaos nanonet device 100 may various signal paths based on metallic and semiconductive properties between the two electrodes selected in association with input bits. Output bits may be generated corresponding to a formed signal path.

For example, when a signal path is formed between two electrodes, the chaos nanonet device 100 may generate an output bit "1". On the other hand, when a signal path is not formed, the chaos nanonet device 100 may generate an output bit "0".

FIG. 10 is a block diagram illustrating a physical unclonable function (PUF) security apparatus based on a chaos nanonet according to an embodiment of the present invention.

Referring to FIG. 10, a chaos nanonet-based PUF security apparatus 1000 includes a first response generator 610, a decoder 620, a chaos nanonet device 630, a second response generator 640, and a security key generator 650.

The first response generator 610 generates a challenge bit into an input bit. The first response generator 610 may be a first multiple input shift register. For example, the first response generator 610 may generate an input bit by moving a challenge bit to the left or right using a plurality of flip-flops and counters.

The decoder 620 selects two electrodes corresponding to addresses related to generated input bits. For example, the decoder 620 may select two electrodes corresponding to converted input bits with reference to addresses of a plurality of electrodes included in the electrode array.

In accordance with an embodiment, the decoder 620 may select two electrodes corresponding to addresses related to input bits considering a selected domain size. The domain size selection may be determined considering an input area for input bits and an output area for output bits corresponding to the input bits.

The chaos nanonet device 630 may include the nanonet material, which has metallic and semiconductive properties dispersed on the substrate, and an electrode array, which is composed of a plurality of electrodes having a selected domain size on the nanonet material and including a selected electrode to which a bias is applied in an off current range.

In accordance with an embodiment, the chaos nanonet device 630 may generate output bits for formation of a signal path between selected electrodes.

Here, the chaos nanonet device 630 has been described in detail above.

In addition, the chaos nanonet device 630 may include a flexible substrate, a nanonet material dispersed on the flexible substrate, and an electrode array.

In addition, the nanonet material may be composed of a plurality of carbon nanotubes.

The flexible substrate may include at least one of polyimide, polyester, polyethylene napthalate, Teflon, polyethylene terephthalate, polydimethyl siloxane, and other polymers.

The carbon nanotubes are formed on the flexible substrate. More particularly, the carbon nanotubes may be formed on the flexible substrate by at least one spray coating method of a slot die coating method and a mayer bar coating method.

The flexible substrate has a property of being bent or stretched by heat, and thus, there may be a disadvantage in that the carbon nanotubes are formed on the flexible substrate.

Accordingly, the chaos nanonet device of the present invention may require a process of fabricating a flexible substrate so as to address the drawback.

In accordance with an aspect of the present invention, a process of fabricating the flexible substrate may include a process of forming a sacrificial layer on a hard substrate, a process of forming a flexible substrate on the formed sacrificial layer, and a process of separating the flexible substrate and the hard substrate from each other by contacting water.

The carbon nanotubes may be dispersed on the flexible substrate using chirality, and the carbon nanotubes may be dispersed in a random network shape on the substrate considering a selected density and thickness.

The density and thickness selection may be determined by the diameters of the carbon nanotubes and chirality, and may be varied depending upon depending upon an environmental condition of a hardware in which the carbon nanotubes are used, e.g., conditions such as temperature variation and deterioration.

In accordance with an aspect of the present invention, the carbon nanotubes may be dispersed on the substrate in at least one shape of a random network, a directional network, a crossbar network, and a combination of the random network, the directional network, and the crossbar network.

For example, the carbon nanotubes may be dispersed in a random network shape without specific patterns and rules on the substrate.

In addition, since the carbon nanotubes are dispersed, in a directional network shape based on a vertical junction, on the substrate, the carbon nanotubes may be applied to security devices for ultra-small IoT apparatuses and may exhibit excellent field effect.

In addition, the carbon nanotubes may be dispersed, in a crossbar network shape having a horizontal cross pattern, on the substrate.

The electrode array may include a plurality of electrodes that are formed on the carbon nanotubes and have a selected domain size. The domain size selection may be determined considering an input area for input bits of a security chip and an output area for output bits of the security chip corresponding to the input bits.

Here, the chaos nanonet device 630 may provide a signal path corresponding to chirality betweento electrodes selected by the decoder 620, and may generate an output bit for signal path formation between the selected electrodes.

For example, the chaos nanonet device 630 may generate an output bit "1" when a signal path is connected. On the other hand, when a signal path is not connected, the chaos nanonet device 630 may generate an output bit "0".

The second response generator 640 generates an output bit as a response bit.

A PUF security apparatus 600 may operate as a security apparatus based on the number of correspondence cases between a challenge bit and a response bit using the first response generator 610 and the second response generator 640.

The security key generator 650 generates a response bit into a public key and a private key using an application specific integrated circuit (ASIC). The ASIC may include a module computing an asymmetric key that includes a public key and private key.

For example, the security key generator 650 may generate a response bit into a public key and private key using ASIC including an elliptic curve cryptosystem (ECC) algorithm.

ECC is defined by Equation: $u^2=x^3+ax+b$, and is an encryption manner designed by Neal Koblitz, a mathematics professor at the University of Washington in 1985, and Victor Miller at an IBM Institute.

Figure 11:
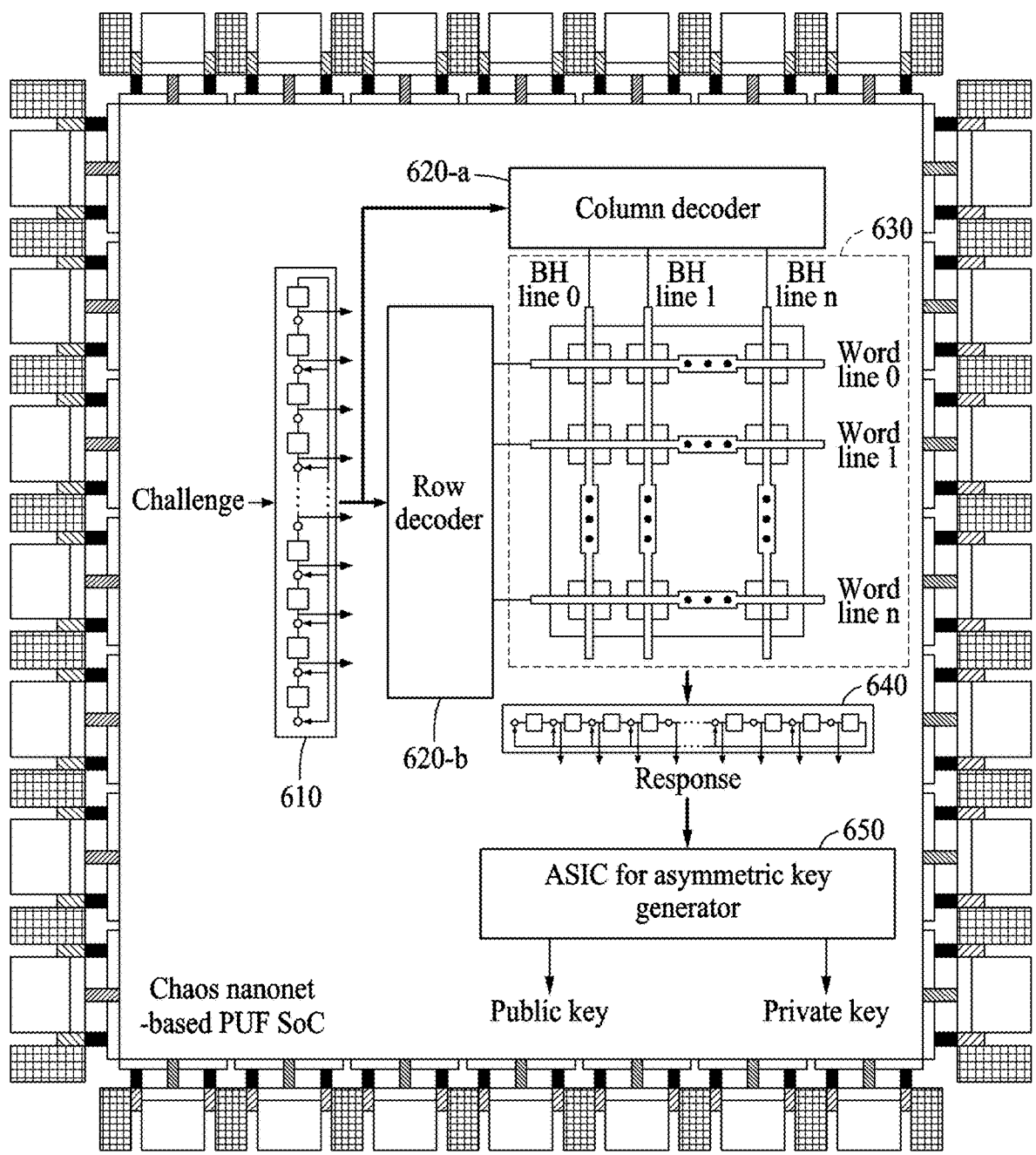
FIG. 11 illustrates the chaos nanonet-based physical unclonable function security apparatus of FIG. 10 represented as a system on chip (SOC).

FIG. 11 illustrates the chaos nanonet-based physical unclonable function security apparatus of FIG. 10 represented as a system on chip (SOC).

Referring to FIG. 11, a PUF security chip may include a first response generator 610, decoders 620-*a* and 620-*b*, a chaos nanonet device 630, a second response generator 640, and a security key generator 650.

The first response generator 610 generates a challenge bit into an input bit. The first response generator 610 may generate an input bit by moving a challenge bit to the left or right using a plurality of flip-flops and counters.

The decoders 620-*a* and 620-*b* select two electrodes corresponding to addresses related to generated input bits. For example, the decoders 620-*a* and 620-*b* may select two electrodes corresponding to converted input bits with reference to addresses of a plurality of electrodes included in the electrode array.

In accordance with an aspect of the present invention, a PUF security chip based on the chaos nanonet may include both the decoders 620-*a* and 620-*b* separated by a row and a column so as to select two electrodes corresponding to input bits.

The chaos nanonet device 630 may generate output bits corresponding to signal path formation between the selected electrodes.

To accomplish this, the chaos nanonet device 630 may include a substrate, a nanonet material dispersed on the substrate, and an electrode array.

The nanonet material may be dispersed on the substrate using chirality, and may be dispersed in a random network shape on the considering a selected density and thickness.

In accordance with an aspect of the present invention, the nanonet material may be dispersed on the substrate in at least one shape of a random network, a directional network, a crossbar network, and a combination of the random network, the directional network, and the crossbar network.

The electrode array is formed on the nanonet material and may include a plurality of electrodes having a selected domain size. The domain size selection may be determined considering an input area for input bits of a security chip and an output area for output bits of the security chip corresponding to the input bits.

Here, the chaos nanonet device 630 may provide a signal path corresponding to chirality betweento electrodes selected by the decoder 620, and may generate an output bit for signal path formation between the selected electrodes.

In accordance with an embodiment, the chaos nanonet device 630 may include a flexible substrate, carbon nanotubes dispersed on the flexible substrate, and an electrode array.

The flexible substrate may include at least one of polyimide, polyester, polyethylene napthalate, Teflon, polyethylene terephthalate, polydimethyl siloxane, and other polymers.

The carbon nanotubes are formed on the flexible substrate. More particularly, the carbon nanotubes may be formed on the flexible substrate by at least one spray coating method of a slot die coating method and a mayer bar coating method.

The flexible substrate has a property of being bent or stretched by heat, and thus, there may be a disadvantage in that the carbon nanotubes are formed on the flexible substrate.

Accordingly, the chaos nanonet device of the present invention may require a process of fabricating a flexible substrate so as to address the drawback.

In accordance with an aspect of the present invention, a process of fabricating the flexible substrate may include a process of forming a sacrificial layer on a hard substrate, a process of forming a flexible substrate on the formed sacrificial layer, and a process of separating the flexible substrate and the hard substrate from each other by contacting water.

The carbon nanotubes may be dispersed on the flexible substrate using chirality, and the carbon nanotubes may be dispersed in a random network shape on the substrate considering a selected density and thickness.

The density and thickness selection may be determined by the diameters of the carbon nanotubes and chirality, and may be varied depending upon depending upon an environmental condition of a hardware in which the carbon nanotubes are used, e.g., conditions such as temperature variation and deterioration.

In accordance with an aspect of the present invention, the carbon nanotubes may be dispersed on the substrate in at least one shape of a random network, a directional network, a crossbar network, and a combination of the random network, the directional network, and the crossbar network.

For example, the carbon nanotubes may be dispersed in a random network shape without specific patterns and rules on the substrate.

In addition, since the carbon nanotubes are dispersed, in a directional network shape based on a vertical junction, on the substrate, the carbon nanotubes may be applied to security devices for ultra-small IoT apparatuses and may exhibit excellent field effect.

In addition, the carbon nanotubes may be dispersed, in a crossbar network shape having a horizontal cross pattern, on the substrate.

The electrode array may include a plurality of electrodes that are formed on the carbon nanotubes and have a selected domain size. The domain size selection may be determined considering an input area for input bits of a security chip and an output area for output bits of the security chip corresponding to the input bits.

In addition, in accordance with an embodiment, the chaos nanonet device 630 may provide a signal path corresponding to chirality betweento the selected electrodes by the decoder 620. Output bits may be formed corresponding to signal path formation between the selected electrodes.

The second response generator 640 generates an output bit into a response bit. Accordingly, a PUF security apparatus 500 may operate as a security apparatus based on the number of correspondence cases between a challenge bit and a response bit using the first response generator 610 and the second response generator 640.

The security key generator 650 generates a response bit into a public key and a private key using an ASIC. The ASIC may include a module computing an asymmetric key that includes a public key and private key.

Figure 12:
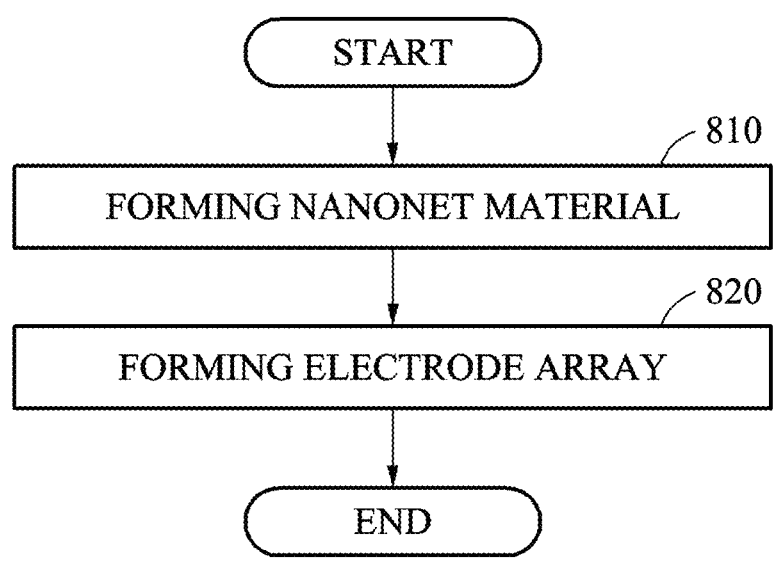
FIG. 12 is a flowchart illustrating a method of fabricating a chaos nanonet device according to an embodiment of the present invention.

FIG. 12 is a flowchart illustrating a method of fabricating a chaos nanonet device according to an embodiment of the present invention.

Referring to FIG. 12, in step 810 of a method of fabricating the chaos nanonet device, a nanonet material having metallic and semiconductive properties dispersed on the substrate is formed.

Here, the nanonet material may include at least one of a nanowire and a carbon nanotube. In addition, the nanonet material may include at least one of a plurality of a nanowires and a plurality of carbon nanotubes.

In step 820 of the method of fabricating the chaos nanonet device, an electrode array composed of a plurality of electrodes having a selected domain size on a nanonet material and including a selected electrode to which a bias is applied in an off current range.

For example, domain size selection may be determined considering an input area for input bits of a PUF security apparatus (or a security chip) and an output area for output bits of the PUF security apparatus corresponding to the input bits.

In addition, the metallic property of a nanonet material around a drain electrode to which voltage is applied may be eliminated. Here, a gate electrode may be in a floating state.

In accordance with an embodiment, a signal of the nanonet material may be divided into "0" and "1" which correspond to metallic and semiconductive properties by applying a bias to a selected electrode in a selected metallic/semiconductive current ratio in an off current range.

In accordance with an aspect of the present invention, by an electric burning method, voltage may be applied to the selected electrode by sweeping voltage considering at least one of a growth density function parameter, a metallic parameter, and a semiconductive parameter of the nanonet material.

In accordance with another aspect of the present invention, in the case of electric burning method, voltage may be applied to a selected electrode corresponding to a map rule considering at least one of a selected domain size and the number of a plurality of electrodes.

The map rule may include information on the number and locations of selected electrodes corresponding to at least one of selected domain sizes and electrode numbers In addition, in step 810 of the method of fabricating the chaos nanonet device, a corresponding signal path is provided betweento any selected electrodes from the electrode array.

In accordance with an embodiment, in step 810 of the method of fabricating the chaos nanonet device, the carbon nanotubes may be formed on a flexible substrate. More particularly, in step 810 of the method of fabricating the chaos nanonet device, the carbon nanotubes may be formed on a flexible substrate by at least one spray coating method of a slot die coating method and a mayer bar coating method.

The flexible substrate may include at least one of polyimide, polyester, polyethylene napthalate, Teflon, polyethylene terephthalate, polydimethyl siloxane, and other polymers.

The flexible substrate has a property of being bent or stretched by heat, and thus, there may be a disadvantage in that the carbon nanotubes are formed on the flexible substrate.

Accordingly, the chaos nanonet device of the present invention may require a process of fabricating a flexible substrate so as to address the drawback.

In accordance with an aspect of the present invention, the process of fabricating the flexible substrate may include a process of forming a sacrificial layer on a hard substrate, a process of forming a flexible substrate on the formed sacrificial layer, and a process of separating the flexible substrate and the hard substrate from each other by contacting water.

In addition, in accordance with an embodiment, in step 820 of the method of fabricating the chaos nanonet device, an electrode array including a plurality of electrodes having a selected domain size may be formed on a carbon. The domain size selection may be determined considering an input area for input bits of a security chip and an output area for output bits of the security chip corresponding to the input bits.

In accordance with an aspect of the present invention, in step 810 of the method of fabricating the chaos nanonet device to provide flexibility, the carbon nanotubes dispersed on the substrate may be formed considering a selected density and thickness.

Density and thickness selection may be determined depending upon the diameters of the carbon nanotubes and chirality, and may be varied depending upon depending upon an environmental condition of a hardware in which the carbon nanotubes are used, e.g., conditions such as temperature variation and deterioration.

In addition, in step 810 of the method of fabricating the chaos nanonet device, the carbon nanotubes dispersed on the substrate may be formed in at least one shape of a random network, a directional network, a crossbar network, and a combination of the random network, the directional network, and the crossbar network.

In addition, in step 810 of the method of fabricating the chaos nanonet device, the randomness of a signal path may be included by an etching process of imparting a selected etching pattern.

The etching pattern selection may be determined considering the positions of a plurality of electrodes in the chaos nanonet device. The selected etching pattern may include various patterns such as a "——"-shape pattern, a cross pattern, a zigzag pattern, and a combination thereof.

Accordingly, in step 810 of the method of fabricating the chaos nanonet device, chirality of the dispersed carbon nanotubes having metallic and semiconductive properties may be increased by the etching pattern, and the randomness of a signal path may be provided from the increased chirality.

In addition, in step 810 of the method of fabricating the chaos nanonet device, the randomness of a signal path may be provided by applying voltage to a selected electrode among electrodes included in the electrode array such that an area in which the metallic property of carbon nanotubes around the selected electrode is eliminated is included.

In addition, in step 810 of the method of fabricating the chaos nanonet device, a signal path corresponding to chirality is provided betweento any electrodes selected from the electrode array. Here, an element selecting any electrodes from electrode arrays may be a decoder.

In accordance with an embodiment, the chaos nanonet device may generate output bits of a security chip corresponding signal path formation between two electrodes selected in association with input bits of the security chip. The two electrodes in association with the input bits may be selected by a decoder.

More particularly, the chaos nanonet device may form various signal paths based on metallic and semiconductive properties between two electrodes selected in association with input bits, and may generate output bits corresponding to the formed signal path.

FIG. 13 is a flowchart illustrating an operation method of a chaos nanonet-based physical unclonable function security apparatus according to an embodiment of the present invention.

Referring to FIG. 11, the chaos nanonet-based PUF security apparatus converts a challenge bit into an input bit in step 1110. In step 1110, the chaos nanonet-based PUF security apparatus may a challenge bit into input bit by moving the challenge bit to the left or right using a plurality of flip-flops and counters.

In step 1120, the chaos nanonet-based PUF security apparatus selects two electrodes corresponding to an address related to the converted input bit. For example, in step 1120, the chaos nanonet-based PUF security apparatus may select two electrodes corresponding to input bits converted with reference to registers of a plurality of electrodes included in the electrode array.

In addition, in step 1120, the chaos nanonet-based PUF security apparatus may select two electrodes corresponding to an address related to input bits considering a selected domain size. The domain size selection may be determined considering an input area for input bits and an output area for output bits corresponding to the input bits.

In step 1130, the chaos nanonet-based PUF security apparatus generates output bits for signal path formation between the selected electrodes.

To accomplish this, the PUF security apparatus may include a substrate, a nanonet material dispersed on the substrate, and an electrode array.

In accordance with an embodiment, the chaos nanonet-based PUF security apparatus may include a flexible substrate, carbon nanotubes dispersed on the flexible substrate, and an electrode array.

The flexible substrate may include at least one of polyimide, polyester, polyethylene napthalate, Teflon, polyethylene terephthalate, polydimethyl siloxane, and other polymers.

The carbon nanotubes are formed on the flexible substrate. More particularly, the carbon nanotubes may be formed on a flexible substrate according to at least one spray coating method of a slot die coating method and a mayer bar coating method.

The flexible substrate has a property of being bent or stretched by heat, and thus, there may be a disadvantage in that the carbon nanotubes are formed on the flexible substrate.

Accordingly, the chaos nanonet device of the present invention may require a process of fabricating a flexible substrate so as to address the drawback.

In accordance with an aspect of the present invention, a process of fabricating the flexible substrate may include a process of forming a sacrificial layer on a hard substrate, a process of forming a flexible substrate on the formed sacrificial layer, and a process of separating the flexible substrate and the hard substrate from each other by contacting water.

The carbon nanotubes may be dispersed on the flexible substrate using chirality, and the carbon nanotubes may be dispersed in a random network shape on the substrate considering a selected density and thickness.

The density and thickness selection may be determined by the diameters of the carbon nanotubes and chirality, and may be varied depending upon depending upon an environmental condition of a hardware in which the carbon nanotubes are used, e.g., conditions such as temperature variation and deterioration.

In accordance with an aspect of the present invention, the carbon nanotubes may be dispersed on the substrate in at least one shape of a random network, a directional network, a crossbar network, and a combination of the random network, the directional network, and the crossbar network.

For example, the carbon nanotubes may be dispersed in a random network shape without specific patterns and rules on the substrate.

Since the carbon nanotubes are dispersed, in a directional network shape based on a vertical junction, on the substrate, the carbon nanotubes may be applied to security devices for ultra-small IoT apparatuses and may exhibit excellent field effect.

In addition, the carbon nanotubes may be dispersed, in a crossbar network shape having a horizontal cross pattern, on the substrate.

The electrode array may include a plurality of electrodes that are formed on the carbon nanotubes and have a selected domain size. The domain size selection may be determined considering an input area for input bits of a security chip and an output area for output bits of the security chip corresponding to the input bits.

The chaos nanonet-based PUF security apparatus converts an output bits into a response bit in step 1140 and generates a response bit into a public key and a private key using an ASIC in step 1150. The ASIC may include a module computing an asymmetric key that includes a public key and private key.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

The invention claimed is:

1. A chaos nanonet device, comprising:
   a nanonet material having a metallic property and a semiconductive property dispersed a substrate; and
   an electrode array composed of a plurality of electrodes that has a selected domain size on the nanonet material and comprises selected electrodes to which a bias is applied in an off current range,
   wherein the nanonet material provides a signal path between any electrodes selected from the electrode array,
   wherein the signal path is formed between two randomly selected electrodes of the electrode array based on randomness of dispersed carbon nanotubes having the metallic property and the semiconductive property, and
   wherein the nanonet device generates output bits corresponding to signal path formation between two electrodes of the electrode array selected in association with input bits, generates response bits based on the output bits, and generates a public key and a private key using an application specific integrated circuit (ASIC) based on the response bits.

2. The chaos nanonet device according to claim 1, wherein the selected electrodes are biased in a metallic/semiconductive current ratio selected in the off current range.

3. The chaos nanonet device according to claim 1, wherein a signal of the nanonet material is classified into signals corresponding to a metallic property and a semiconductive property by the selected electrodes.

4. The chaos nanonet device according to claim 1, wherein the nanonet material is dispersed on the substrate in at least one shape of a random network, a directional network, a crossbar network, and a combination of the random network, the directional network, and the crossbar network.

5. The chaos nanonet device according to claim 1, wherein the nanonet material comprises randomness of a signal path generated by an etching process of providing a selected pattern.

6. A chaos nanonet device, comprising:
   a plurality of carbon nanotubes formed on a flexible substrate; and
   an electrode array comprising a plurality of electrodes that is formed on the carbon nanotubes and has a selected domain size,
   wherein the carbon nanotubes provide a signal path to corresponding chirality between any electrodes selected from the electrode array,
   wherein the signal path is formed between two randomly selected electrodes of the electrode array based on randomness of dispersed carbon nanotubes having a metallic property and a semiconductive property, and
   wherein the nanonet device generates output bits corresponding to signal path formation between two electrodes of the electrode array selected in association with input bits, generates response bits based on the output bits, and generates a public key and a private key using an application specific integrated circuit (ASIC) based on the response bits.

7. The chaos nanonet device according to claim 6, wherein the carbon nanotubes are formed on the flexible substrate by at least one spray coating method of a slot die coating method and a mayer bar coating method.

8. The chaos nanonet device according to claim 6, wherein a sacrificial layer is formed on a hard substrate, the flexible substrate is formed on the formed sacrificial layer, and the flexible substrate and the hard substrate are separated from each other by contacting water.

9. The chaos nanonet device according to claim 6, wherein the carbon nanotubes is formed on the substrate in at least one shape of a random network, a directional network, a crossbar network, and a combination of the random network, the directional network, and the crossbar network.

10. The chaos nanonet device according to claim 6, wherein the carbon nanotubes comprise randomness of a signal path generated by an etching process of providing a selected pattern.

11. The chaos nanonet device according to claim 6, wherein a metallic property of the carbon nanotubes around the selected electrodes by applying voltage to the selected electrodes is eliminated.

12. A chaos nanonet device, comprising:
    a nanonet material dispersed on a substrate using chirality; and
    an electrode array composed of a plurality of electrode that has a selected domain size on the nanonet material and comprises selected electrodes to which voltage is applied based on an electrical burning manner,
    wherein the nanonet material provides a signal path between any electrodes selected from the electrode array,
    wherein the signal path is formed between two randomly selected electrodes of the electrode array based on randomness of dispersed carbon nanotubes having a metallic property and a semiconductive property, and
    wherein the nanonet device generates output bits corresponding to signal path formation between two electrodes of the electrode array selected in association with input bits, generates response bits based on the output bits, and generates a public key and a private key using an application specific integrated circuit (ASIC) based on the response bits.

13. The chaos nanonet device according to claim 12, wherein a metallic property of the nanonet material around the selected electrodes is eliminated by the electric burning method.

14. The chaos nanonet device according to claim 12, wherein, by the electric burning method, voltage is applied to the selected electrode by sweeping the voltage considering at least one of a growth density function parameter, the metallic parameter, and a semiconductive parameter of the nanonet material.

15. The chaos nanonet device according to claim 12, wherein, by the electric burning method, voltage is applied to the selected electrodes corresponding to a map rule considering at least one of the selected domain size and the number of a plurality of electrodes.

16. A chaos nanonet-based physical unclonable function (PUF) security apparatus, comprising:
    a first response generator generating a challenge bit into an input bit;
    a decoder selecting two electrodes that correspond to an address related to the generated input bit;
    a chaos nanonet device generating an output bit for signal path formation between the selected electrodes;
    a second response generator generating the output bit into a response bit; and
    a security key generator generating the response bit into a public key and a private key using an application specific integrated circuit (ASIC), wherein the chaos nanonet device comprises:
a nanonet material having metallic and semiconductive properties dispersed on the substrate; and
an electrode array composed of a plurality of electrodes that has a selected domain size on the nanonet material and comprise selected electrodes to which a bias is applied in an off current range.

17. The chaos nanonet-based physical unclonable function (PUF) security apparatus according to claim 16, wherein the nanonet material is composed of carbon nanotubes formed on a flexible substrate, and the carbon nanotubes is formed on the flexible substrate by at least one spray coating method of a slot die coating method and a mayer bar coating method.

18. A chaos nanonet-based physical unclonable function (PUF) security apparatus, comprising:
a first response generator generating a challenge bit into an input bit;
a decoder selecting two electrodes that correspond to an address related to the generated input bit;
a chaos nanonet device generating an output bit for signal path formation between the selected electrodes;
a second response generator generating the output bit into a response bit; and
a security key generator generating the response bit into a public key and a private key using an application specific integrated circuit (ASIC),
wherein the chaos nanonet device comprises:
a nanonet material dispersed on the substrate using chirality; and
an electrode array composed of a plurality of electrodes that has a selected domain size on the nanonet material and comprises selected electrode to which voltage is applied based on an electric burning method.

* * * * *